US008978691B2

(12) United States Patent
Avdjian et al.

(10) Patent No.: US 8,978,691 B2
(45) Date of Patent: Mar. 17, 2015

(54) VALVE WITH ADAPTIVE FACIAL SEALING RING

(75) Inventors: Christophe Avdjian, Meyreuil (FR); Jacques Berardo, Vitrolles (FR)

(73) Assignee: Cameron International Corporation, Houston, TX (US)

( * ) Notice: Subject to any disclaimer, the term of this patent is extended or adjusted under 35 U.S.C. 154(b) by 253 days.

(21) Appl. No.: 13/569,836

(22) Filed: Aug. 8, 2012

(65) Prior Publication Data

US 2013/0313457 A1 Nov. 28, 2013

(30) Foreign Application Priority Data

May 23, 2012 (EP) .................................... 12305569

(51) Int. Cl.
*F16K 25/00* (2006.01)
*F16K 5/06* (2006.01)
*F16K 5/20* (2006.01)

(52) U.S. Cl.
CPC ............. *F16K 5/0626* (2013.01); *F16K 5/0689* (2013.01); *F16K 5/205* (2013.01)
USPC .............. 137/315.19; 137/315.31; 137/15.22; 251/175; 251/192; 251/315.16

(58) Field of Classification Search
CPC ......... F16K 5/06; F16K 5/605; F16K 5/0631; F16K 5/20; F16K 5/201; F16K 5/204
USPC ............. 137/315.18, 315.19, 315.31, 315.32, 137/15.22, 15.23, 613; 251/175, 176, 180, 251/185, 192, 314, 315, 315.16, 316, 251/317.01
See application file for complete search history.

(56) References Cited

U.S. PATENT DOCUMENTS

| 3,155,368 | A | | 11/1964 | Shafer |
| 3,195,857 | A | * | 7/1965 | Shafer ........................ 251/309 |
| 3,352,155 | A | | 11/1967 | Penet |
| 3,373,968 | A | | 3/1968 | Scaramucci |
| 3,589,674 | A | | 6/1971 | Jones |
| 4,059,250 | A | | 11/1977 | Guldener et al. |
| 4,246,928 | A | | 1/1981 | Burns et al. |
| 4,262,688 | A | | 4/1981 | Bialkowski |
| 4,385,747 | A | | 5/1983 | Renaud et al. |

(Continued)

FOREIGN PATENT DOCUMENTS

| DE | 1122788 | 1/1961 |
| FR | 1375004 | 9/1964 |

(Continued)

OTHER PUBLICATIONS

Avdjian et al., U.S. Appl. No. 13/569,832, filed Aug. 8, 2012.

(Continued)

*Primary Examiner* — John K Fristoe, Jr.
*Assistant Examiner* — Kevin Barss
(74) *Attorney, Agent, or Firm* — Eubanks PLLC

(57) ABSTRACT

A valve including a flow control assembly having an adaptive, floating closure member is provided. In one embodiment, a ball valve includes a floating closure member having a shoulder enclosed within a recess of the valve body. The recess is larger than the shoulder of the closure member and allows axial movement of the closure member with respect to the valve body and along a flow path through the valve. Additional valve systems, devices, and methods are also disclosed.

11 Claims, 13 Drawing Sheets

(56) References Cited

U.S. PATENT DOCUMENTS

| | | | |
|---|---|---|---|
| 4,881,718 A | 11/1989 | Champagne | |
| 5,205,536 A | 4/1993 | Holec | |
| 5,332,193 A | 7/1994 | Giacomini | |
| 5,577,708 A | 11/1996 | Pfannenschmidt | |
| 6,966,537 B2 * | 11/2005 | Sundararajan | 251/172 |
| 6,974,121 B2 | 12/2005 | Koester et al. | |
| 7,896,312 B2 * | 3/2011 | Dalmasso et al. | 251/316 |
| 8,727,314 B2 | 5/2014 | Avdjian | |
| 2003/0192604 A1 | 10/2003 | Tran | |
| 2006/0048825 A1 | 3/2006 | Lomax | |
| 2009/0095931 A1 | 4/2009 | Stunkard | |
| 2011/0049408 A1 | 3/2011 | Gutmann et al. | |
| 2011/0147635 A1 * | 6/2011 | Seveso et al. | 251/315.08 |
| 2011/0266482 A1 | 11/2011 | Dalluge et al. | |
| 2012/0085957 A1 | 4/2012 | Dhawan et al. | |

FOREIGN PATENT DOCUMENTS

| | | |
|---|---|---|
| FR | 2328904 | 5/1977 |
| GB | 945508 | 1/1964 |
| JP | 57144358 | 9/1982 |
| WO | 01/38761 | 5/2001 |

OTHER PUBLICATIONS

Avdjian et al., U.S. Appl. No. 13/569,839, filed Aug. 8, 2012.
Ceuca, European Search Report and Opinion for EP 12305568.3, Oct. 18, 2012.
Ceuca, European Search Report and Opinion for EP 12305569.1, Oct. 18, 2012.
Ceuca, European Search Report and Opinion for EP 12305570.9, Oct. 18, 2012.
Christensen, European Search Report and Opinion for EP 10306377.2, mailed Jun. 6, 2011.
Balzer, International Search Report and Written Opinion for PCT/US2011/062253, mailed Feb. 3, 2012.
Balzer, International Preliminary Report on Patentability for PCT/US2011/062253, mailed Jun. 20, 2013.
Balzer, Communication pursuant to Article 94(3) EPC for EP 10306377.2, mailed Sep. 30, 2013.
Copenheaver, International Search Report and Written Opinion for PCT/US2013/042082, mailed Oct. 4, 2013.
Copenheaver, International Search Report and Written Opinion for PCT/US2013/042077, mailed Oct. 10, 2013.
Copenheaver, International Search Report and Written Opinion for PCT/US2013/042080, mailed Oct. 18, 2013.

* cited by examiner

VALVE WITH ADAPTIVE FACIAL SEALING RING

TECHNICAL FIELD

Embodiments of the present disclosure generally relate to fluid flow control devices, such as ball valves and gate valves.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once desired subterranean resources such as oil or natural gas are discovered, drilling and production systems are often used to access and extract the resources. These systems may be located onshore or offshore depending on the locations of the desired resources. And once extracted, the resources are often transported via pipelines to desired locations, such as refineries. The pipelines typically include valves to control the flow of resources through the pipelines.

As may be appreciated, valves include a flow control mechanism for selectively allowing flow through the valves. For instance, a ball valve includes a ball that may be rotated between open and closed positions to allow or inhibit flow through a conduit. A gate valve similarly includes a sliding gate having an aperture that may be moved into and out of alignment with the bore of a conduit to allow or inhibit flow. Regardless of the type, a valve usually includes one or more sealing surfaces that inhibit leaking of fluid. But in some instances these sealing surfaces may collect particles from the fluid flowing through the valve, reducing sealing effectiveness and longevity. Damage to seals and sealing surfaces also negatively impact sealing performance of the valve. And while valves may be operated in harsh conditions (e.g., high operating pressure or with significant external forces), these conditions have the potential to cause valves to separate from conduits and leak.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to a valve having an adaptive, facial sealing ring. In one embodiment, a ball valve includes a facial sealing ring (also referred to herein as a closure member) with a shoulder received in a recess of the valve body. The recess is larger than the shoulder of the closure member and allows the closure member to translate axially with respect to the body. This axial translation helps compensate for deflection of a fluid conduit away from the valve body and may enable sealing integrity between the valve and the fluid conduit to be maintained during such deflection. And in some embodiments, a ball valve allows fluid to pass between a ball and a seat to push the seat into the closure member to cause the closure member to push into the fluid conduit to maintain sealing integrity with the fluid conduit.

Various refinements of the features noted above may exist in relation to various aspects of the present embodiments. Further features may also be incorporated in these various aspects. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
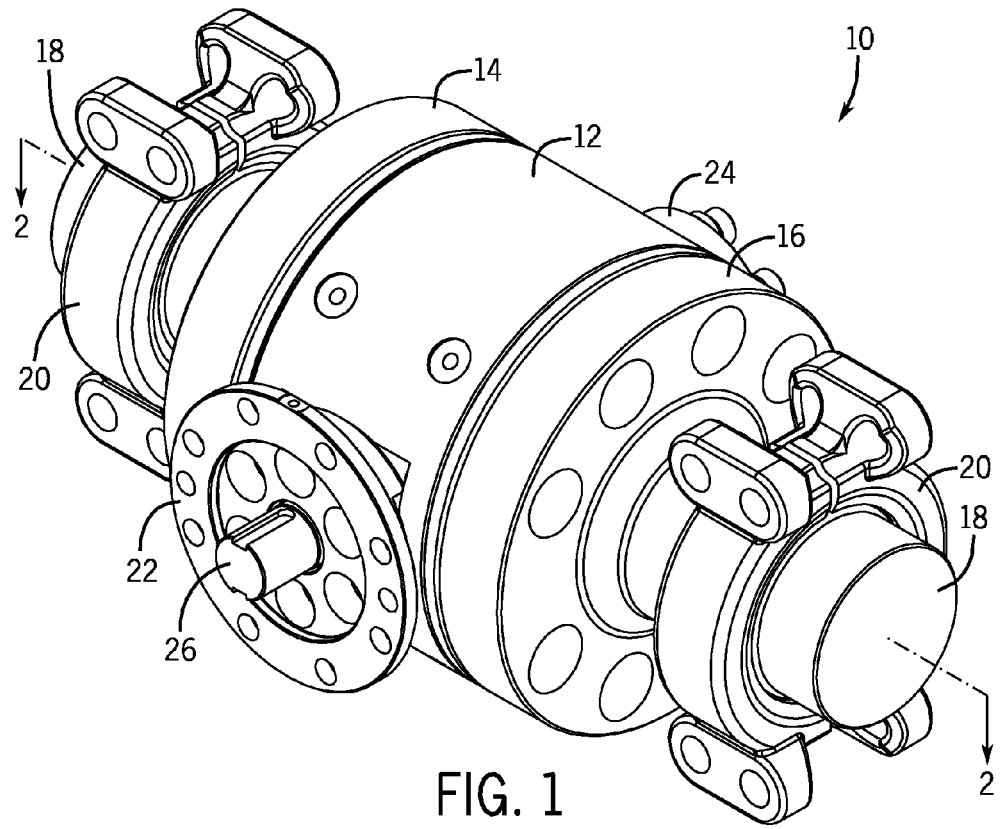
FIG. 1 is a perspective view of a valve having a body disposed between two fluid conduit connectors in accordance with an embodiment of the present disclosure.
Figure 2:
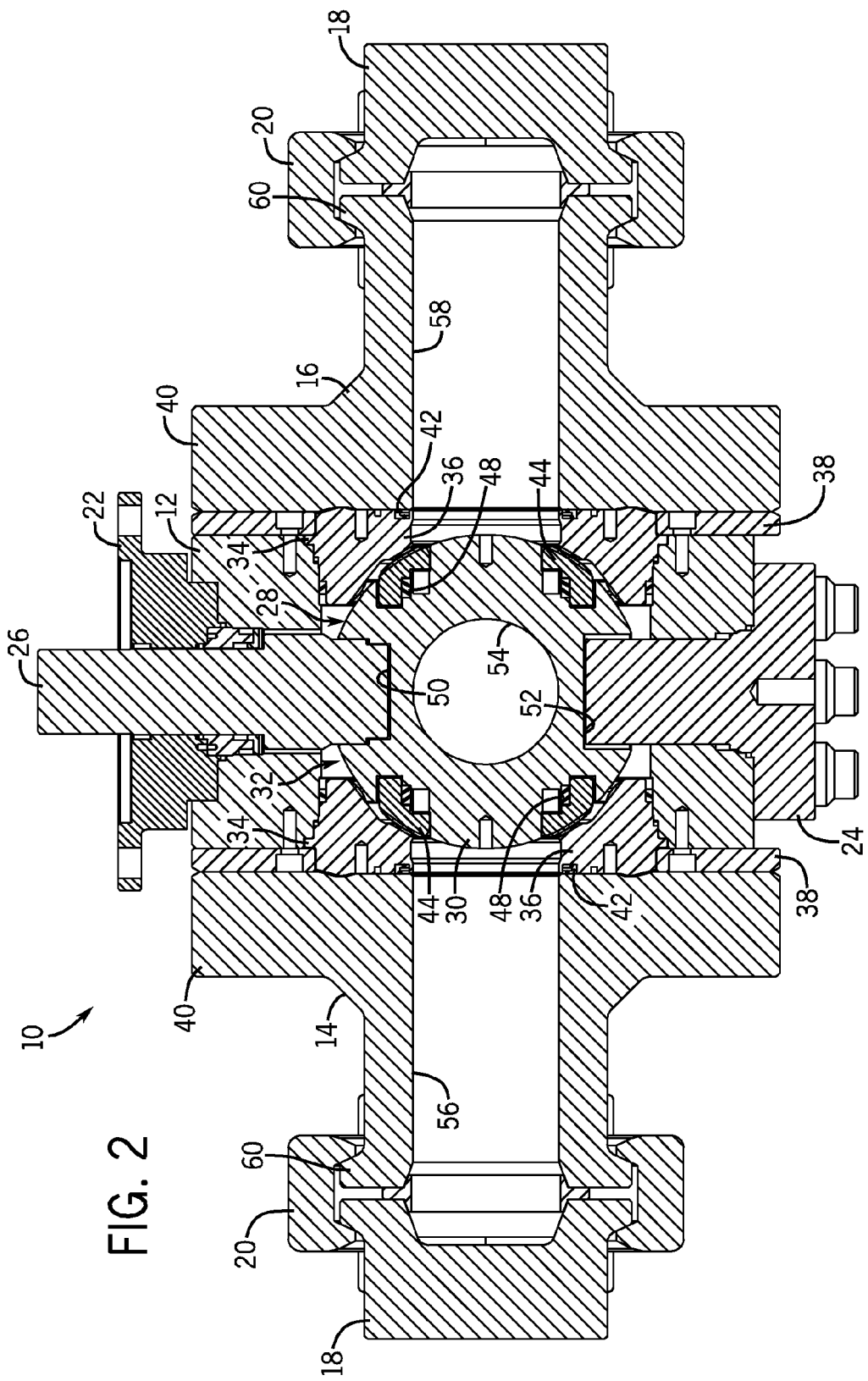
FIG. 2 is a horizontal cross-section of the valve of FIG. 1 and depicts certain internal components of the valve in accordance with one embodiment.

Turning now to the drawings, a valve 10 is illustrated in FIGS. 1 and 2 by way of example. The depicted valve 10 is a ball valve and is described as such below for the sake of explanation. But it will be appreciated that many of the features detailed herein may be used with other valves, such as gate valves and check valves to name only two. The valve 10 includes a body 12 that houses internal flow control components and is disposed between fluid conduit connectors 14 and 16. Blind hubs 18 are attached with clamps 20 to the connectors 14 and 16. These blind hubs 18 may be removed to allow the connectors 14 and 16 to be connected as part of a pipeline or other fluid conduit (e.g., by welding the connectors 14 and 16 to two sections of pipe).

Opposite sides of the body 12 include a cover 22 and a trunnion 24. A flow control assembly 28 is disposed in a cavity 32 of the body 12. The flow control assembly 28 includes a ball 30 that may be turned by a stem 26 and pivot about the trunnion 24 to move between open and closed positions. The ball 30 is disposed between two closure members 36, which may also be referred to as facial sealing rings 36. As described in greater detail below, the closure members 36 include shoulders 34 retained in the body 12 by retaining rings 38 of the body. The retaining rings 38 may be attached to the central portion of the body in any suitable manner, such as with cap screws.

In at least some embodiments, and as presently depicted, the valve 10 is a cartridge valve in which the body 12 and its internal components may be installed in a fluid conduit by inserting the body 12 transverse to the flow axis of the fluid conduit between the connectors 14 and 16 and fastening flanges 40 of these connectors to the body 12 (e.g., with cap screws). Similarly, the body 12 may be removed from the fluid conduit—which allows inspection or replacement of internal valve components—by unfastening the body 12 from the flanges 40 and sliding it out from between the flanges. It will also be appreciated that, in those embodiments in which the connectors 14 and 16 are fastened to the body 12 with cap screws, the retaining rings 38 may include holes (as generally depicted in FIG. 4) to allow the cap screws inserted through the flanges 40 to pass through the retaining rings 38 and into the central portion of the body 12.

The valve 10 includes various seals to control flow and inhibit leaking. For instance, the valve 10 includes facial seals 42 (e.g., lip seals) for sealing the closure members 36 to the end faces of the connectors 14 and 16. The flow control assembly 28 also includes seats 44 and seals 48 on the ball 30. The ball 30 may be rotated into a closed position (depicted in FIG. 2) through keyed engagement of the stem 26 in recess 50 and pivoting of the ball 30 about the trunnion 24 in recess 52 to move the bore 54 of the ball 30 out of alignment with the bores 56 and 58 of the connectors 14 and 16). In this closed position, the seats 44 seal against the closure members 36 and cooperate with the ball 30 to inhibit flow through the valve 10.

Figure 3:
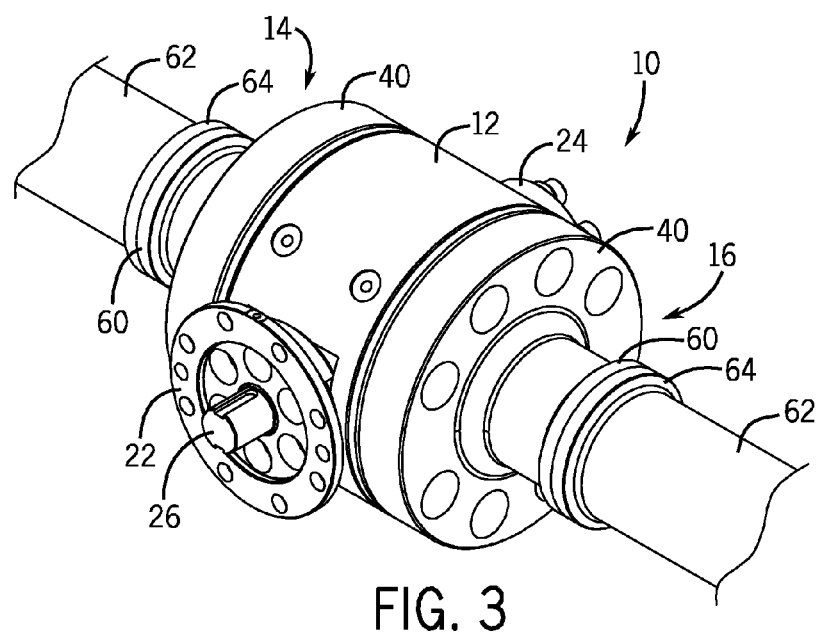
FIG. 3 is a perspective view of the valve of FIG. 1 installed in a fluid conduit in accordance with one embodiment.

As depicted in FIG. 2, the connectors 14 and 16 include flanges 60 on ends opposite the body 12. These flanges 60 facilitate connection to blind hubs 18 via clamps 20. But the flanges 60 may be also connected as part of a fluid conduit as depicted in FIG. 3 in accordance with one embodiment. As shown in FIG. 3, the connectors 14 and 16 are coupled via flanges 60 to two sections 62 of a fluid conduit, such as a pipeline. In the present embodiment, the flanges 60 are welded to flanges 64 of the two sections 62. But the connectors 14 and 16, with or without flanges 60, may be coupled as part of a fluid conduit in any other suitable manner. Indeed, the connectors 14 and 16 may be an integral part of a fluid conduit in some embodiments (e.g., the connectors 14 and 16 may consist of flanges or end faces of sections of a fluid conduit).

Figure 4:
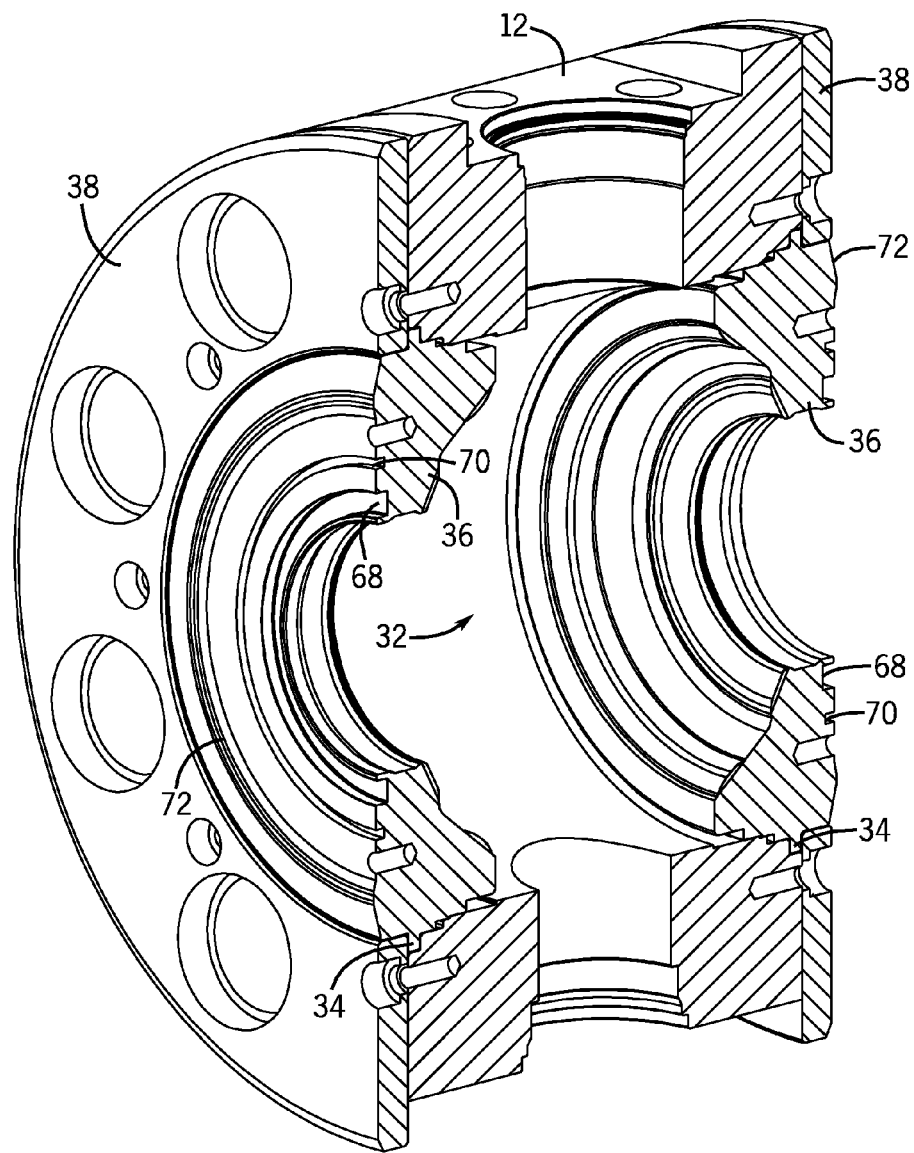
FIG. 4 is a sectional view of closure members of a flow control assembly, the closure members including protective ridges and retained inside the body of the valve of FIG. 1 by a pair of retaining rings of the body in accordance with one embodiment.
Figure 5:
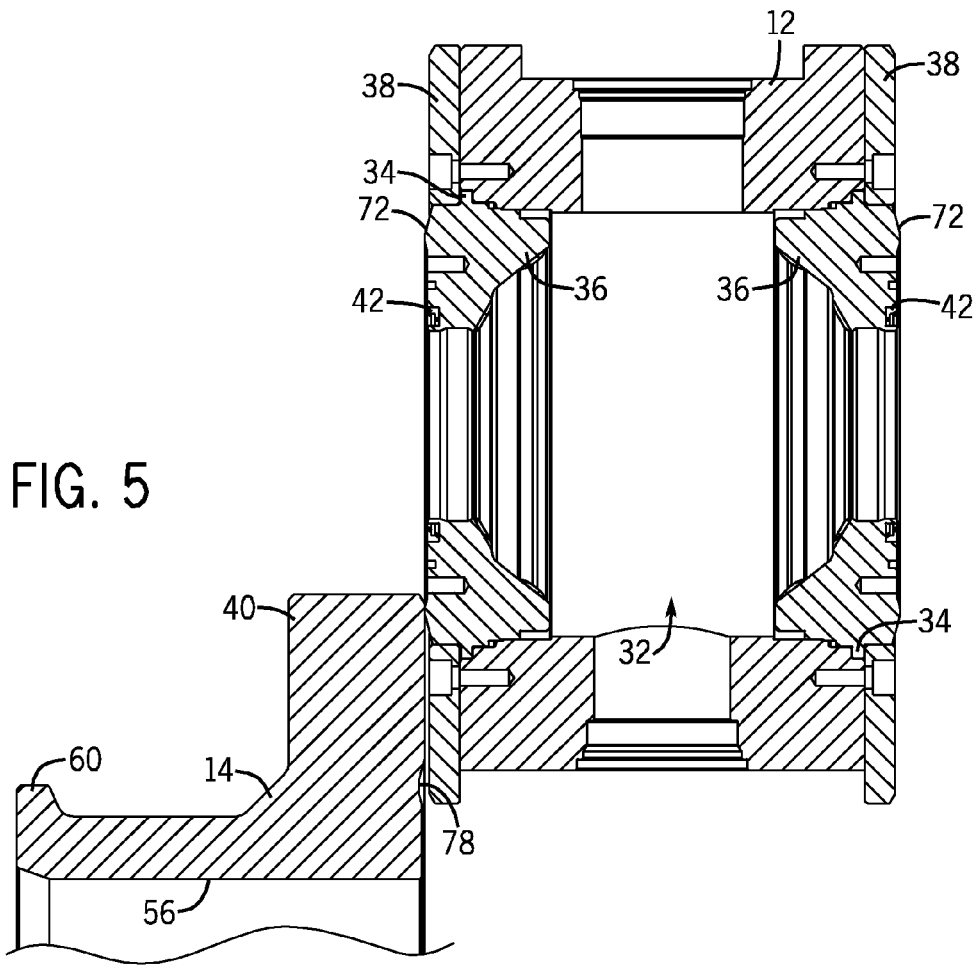
FIGS. 5-12 are cross-sections of one embodiment that generally depict functionality of the protective ridges of the closure members during installation of the body in a fluid conduit.

Certain details of the body 12 and the closure members 36 may be better understood by reference to FIG. 4. This sectional view depicts the closure members 36 and the body 12 without other elements of the valve 10 for the sake of clarity. The retaining rings 38 may be attached to the central portion of the valve body 12 with cap screws through the smaller holes of the retaining rings depicted in FIG. 4 to retain the closure members 36 within the body. And the body 12 may be coupled to the flanges 40 by cap screws that pass through the larger holes of the retaining rings 38 also shown in FIG. 4.

The outer surfaces of the closure members or facial sealing rings 36 include sealing grooves 68 and 70. In the present embodiment, the sealing grooves 68 are configured to receive the facial seals 42 and the sealing grooves 70 may receive additional seals, such as o-rings. Once the body 12 is installed in a fluid conduit, the closure members 36 seal against the fluid conduit (e.g., along end faces of connectors 14 and 16) with the seals in the sealing grooves 68 and 70. But the sealing efficiency of such a seal depends on its condition and the condition of the surface it seals against—a damaged seal or sealing surface may allow fluid to leak from the conduit. And such seals and sealing surfaces may be easily damaged. Left unchecked, the sliding installation of the body 12 into the fluid conduit (e.g., between pipe flanges, like flanges 40) may cause the facial seals 42 or other seals in the closure members 36 to rub against the fluid conduit, causing friction that may wear or even damage the seals. And hard contact between the fluid conduit and other portions of the body 12 may mar or otherwise damage the sealing surfaces.

To reduce premature wear and unintended damage, the outer faces of the closure members 36 include protective ridges 72 that extend outwardly beyond seals installed in the sealing grooves 68 and 70. The protective ridges 72 provide frictional surfaces that reduce the possibility of damage to the seals in the sealing grooves 68 and 70 or to the sealing surfaces by facilitating separation of these seals (and the rest of the outer faces of the closure members 36) apart from the fluid conduit (e.g., the flanges 40) during installation or removal of the body 12. In the present embodiment, the protective ridges 72 are circular ridges that circumscribe and are provided radially outward from the sealing grooves 68 and 70 on the outer faces of the closure members 36. But the protective ridges 72 may take other forms. For instance, rather than unbroken ridges that circumscribes the sealing grooves 68 and 70, the protective ridges 72 may be provided as multiple protrusions on the outer face of each closure member 36. And whether provided as a single ridge or a series of ridges, each protective ridge 72 need not be circular in arrangement (or provided in any other particular geometric shape).

Operation of the protective ridges 72 in protecting facial seals of the closure members 36 may be better understood with reference to FIGS. 5-12, which generally depict installation of the body 12, along with the closure members 36 and facial seals 42, in a fluid conduit (e.g., between a pair of flanges 40). Although certain features depicted in FIG. 2 have been omitted from these figures for the sake of explanation, it will be appreciated that such features may be included in an actual implementation. Further, these figures generally depict movement of the body 12 and a closure member 36 along an end face of the fluid conduit (connector 14 in the illustrated embodiment). But it will also be appreciated that the opposite closure member 36 would move along an opposite end face of the fluid conduit (e.g., of connector 16), and that the protective ridges 72 on both closure members 36 act similarly to that described below.

Figure 6:
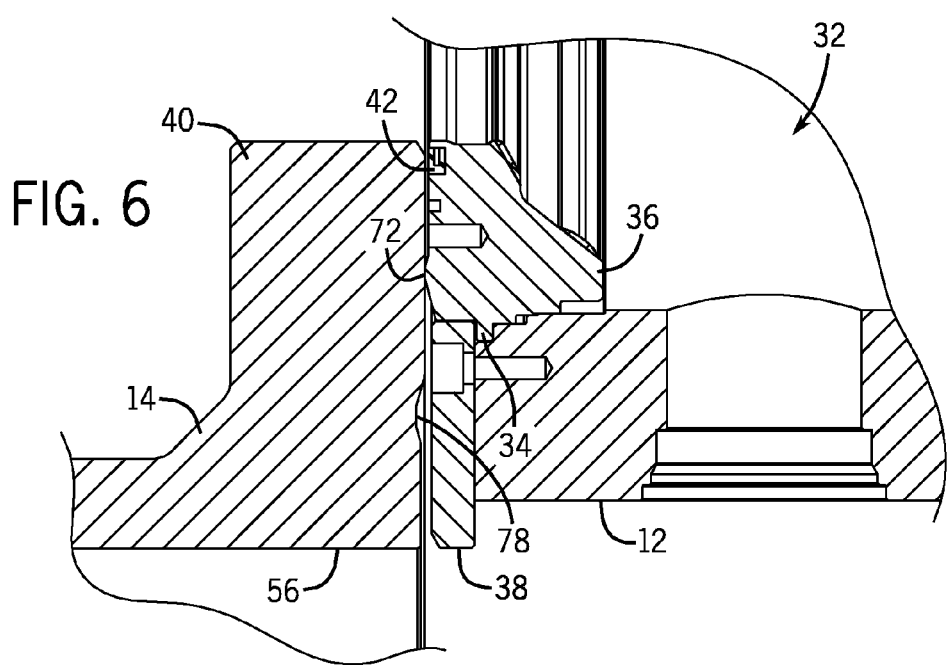
Figure 7:
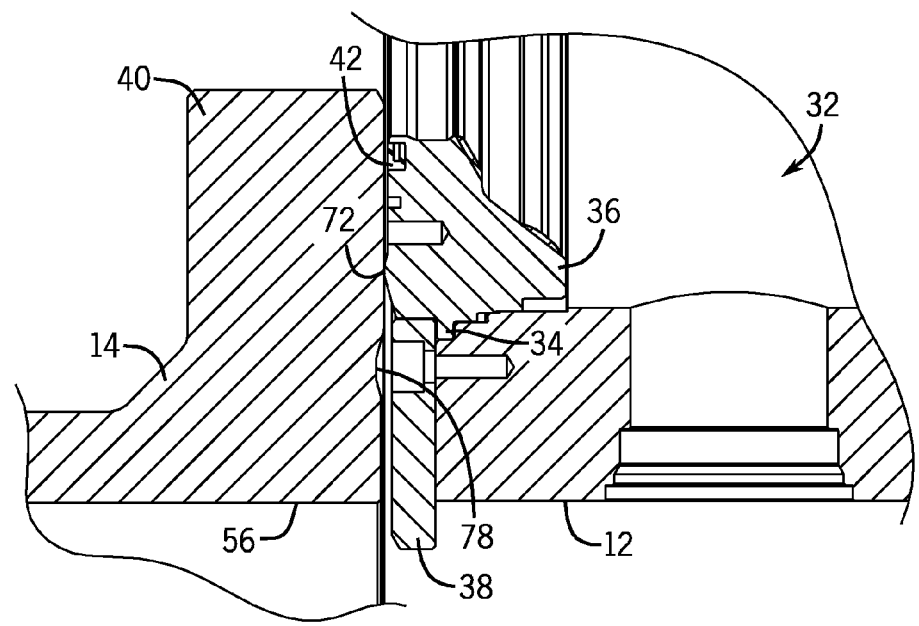
Figure 8:
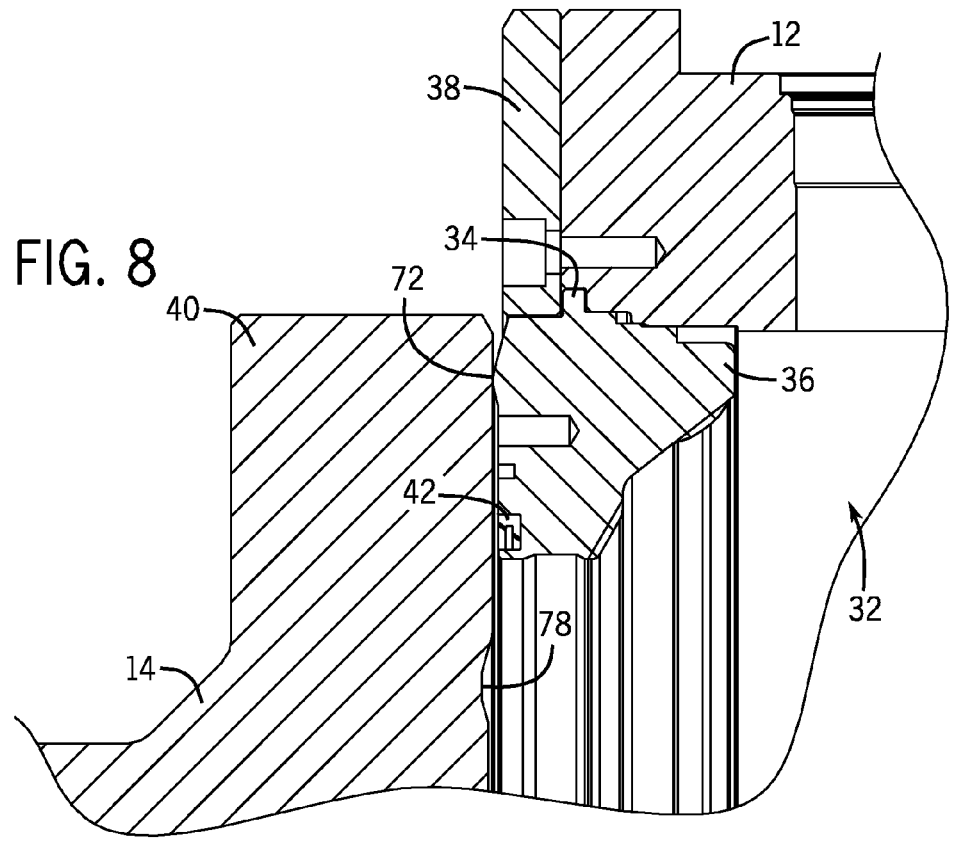
Figure 9:
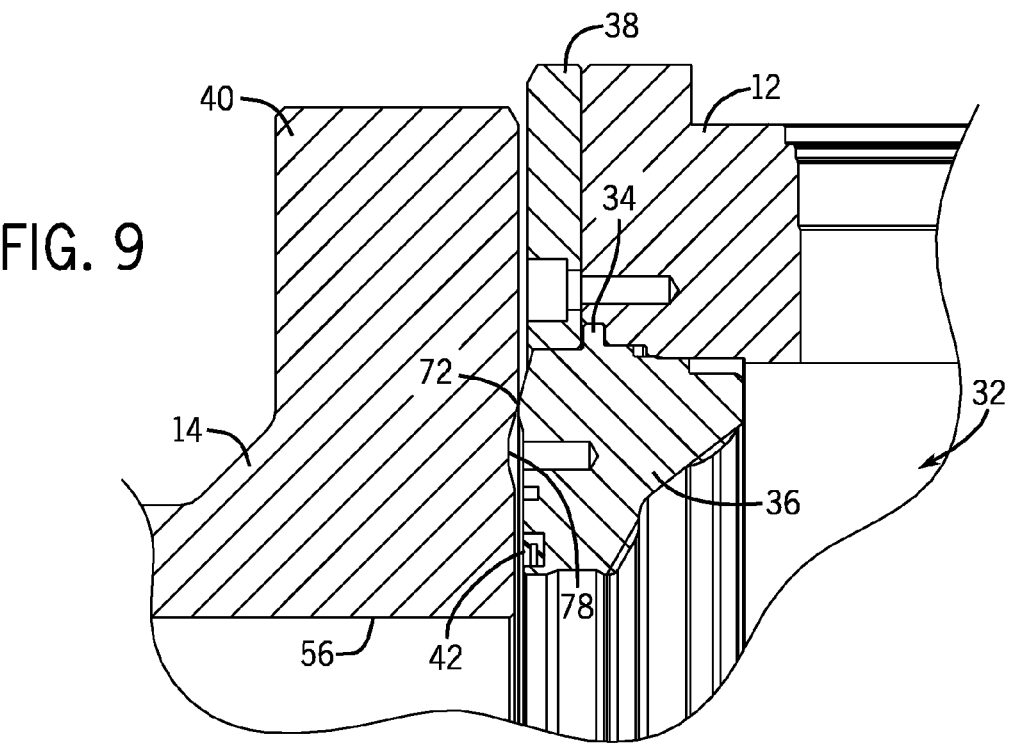
Figure 10:
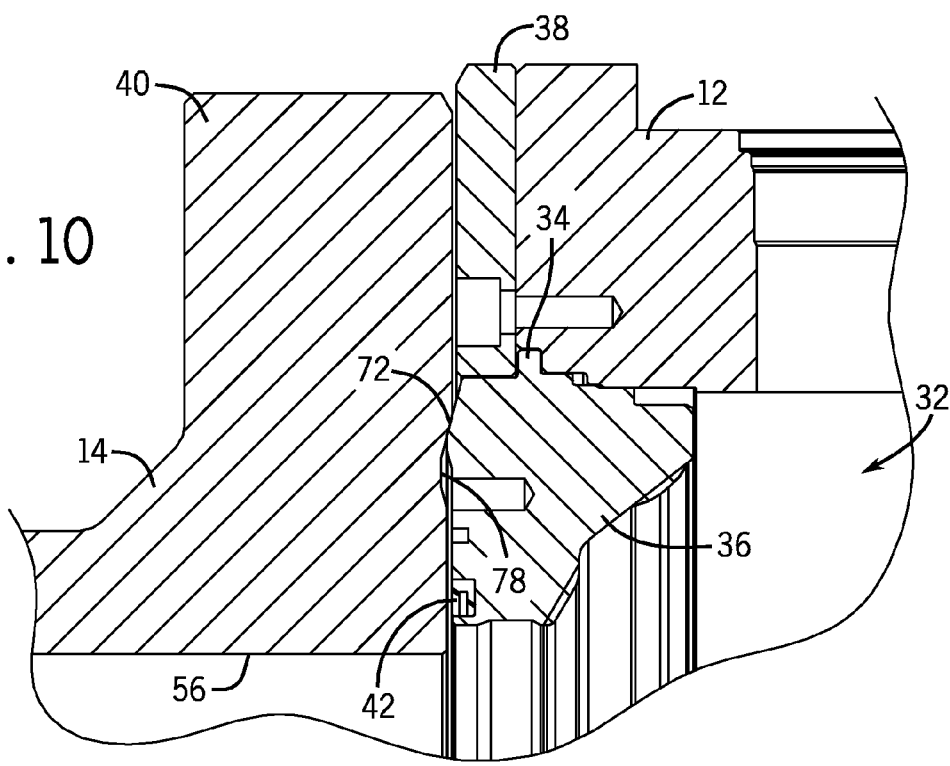
Figure 11:
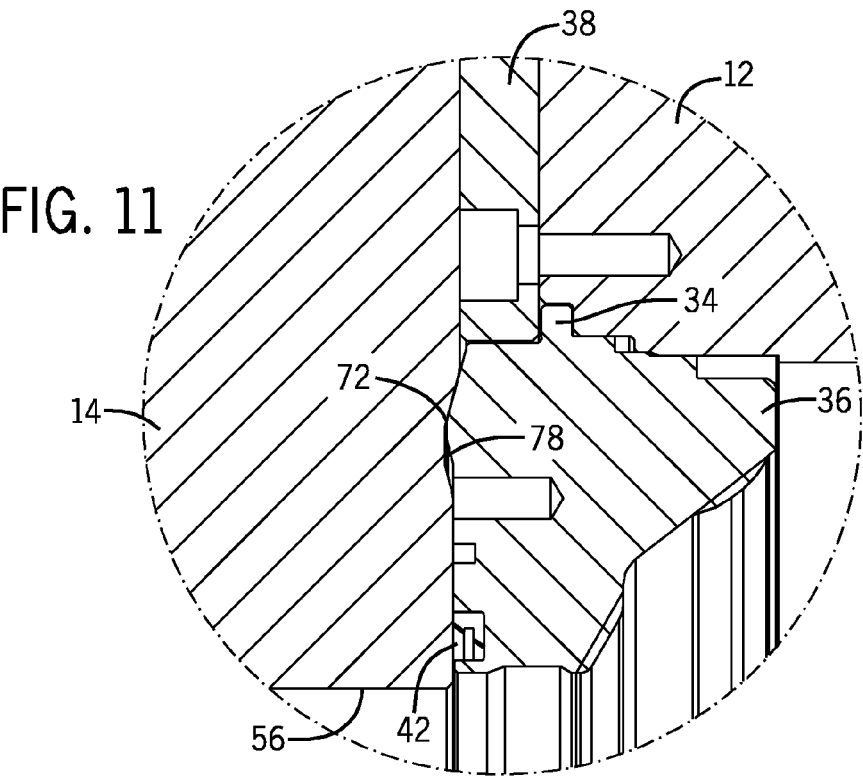
Figure 12:
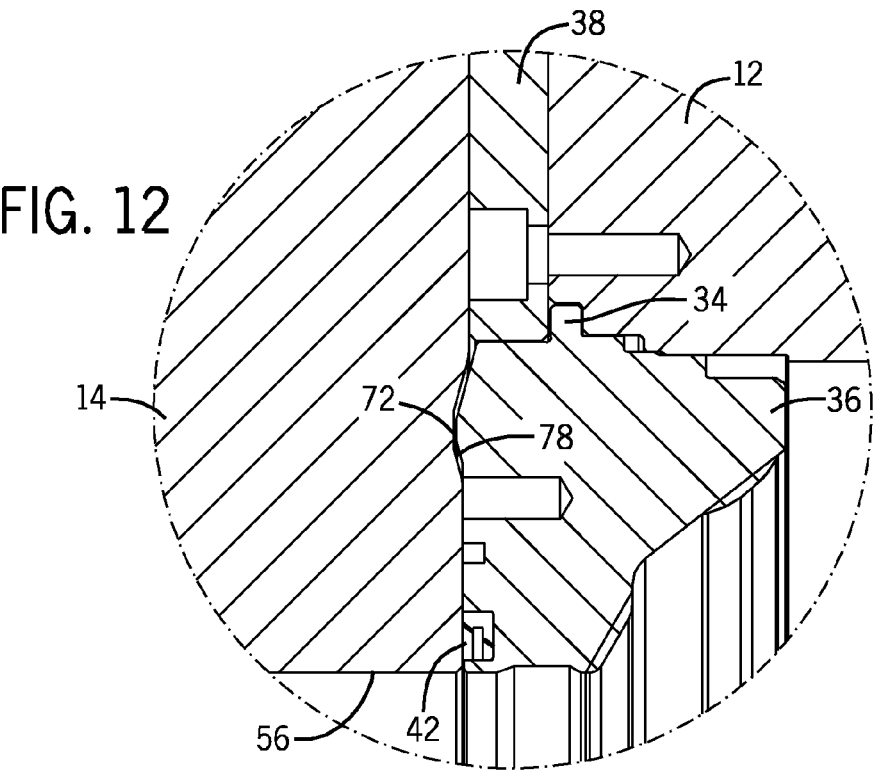
Figure 13:
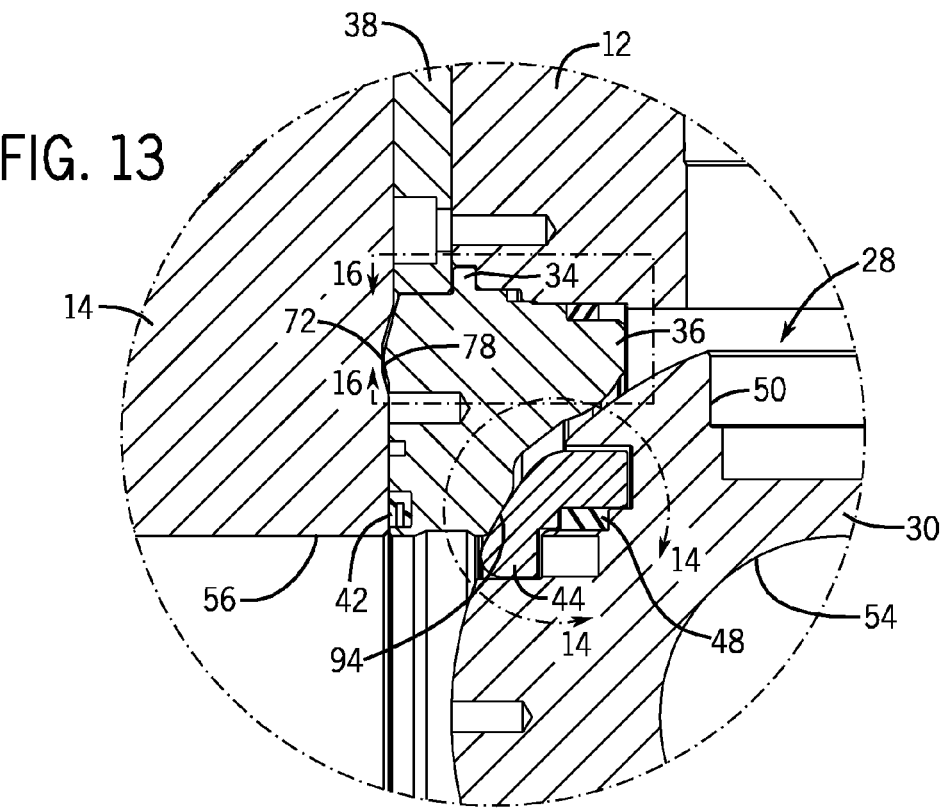
FIGS. 13 and 14 are cross-sections showing additional details of the valve of FIG. 2, including a seat that seals against one of the closure members when the valve is in a closed position and drives the closure member into a connector of a fluid conduit in accordance with one embodiment.

In the present embodiment, the end faces of the flanges 40 include mating recesses 78 for receiving the protective ridges 72. The recesses 78 may be of any shape or configuration that allows the protective ridges 72 to be received in the recesses 78. For example, in an embodiment having circular protective ridges 72, the recesses 78 are also circular. As the body 12 begins to be moved into position between the flanges 40 of the fluid conduit (FIG. 5), the protective ridges 72 engage the flanges 40 to maintain separation between the rest of the body 12 and the flanges 40. As the body 12 is moved downward in the present figures, the body 12 and the closure member 36 slide along in spaced relation to the end face of the flange 40 (noting again that the other closure member 36 would slide along in spaces relation to the other flange 40 in a similar manner). As generally depicted in FIGS. 6-8, the protective ridges 72 of the closure members 36 maintain spacing of the facial seals 42 and the body 12 apart from the flanges 40 during installation of the body 12 to reduce friction on the seals 42 and to reduce the likelihood of damage to the seals 42 or the corresponding sealing surfaces. This spacing or separation is maintained until the protective ridges 72 are landed in the mating recesses 78 of the end faces of flanges 40.

The landing of a protective ridge 72 in a recess 78 is generally illustrated in FIGS. 9-12, and it is noted that the protective ridge of the other closure member 36 would be landed in a mating recess 78 of the other flange 40 in a similar manner. As the protective ridge 72 approaches alignment with the recess 78, the protective ridge begins to engage the recess 78 and reduce the separation of the end face of the flange 40 and the facial seal 42. As the protective ridge 72 is landed in the recess 78, the sealing surfaces of the closure member 36 and the flange 40 engage one another and the facial seal 42 is energized. In this arrangement, the protective ridges 72 keep the sealing surfaces apart for most of the transverse distance travelled by the body during installation in the fluid conduit and reduce wear and damage on the facial seals 42 and the sealing surfaces of the closure member 36 and the flanges 40. And while such a protected facial sealing arrangement that spaces a facial seal from a fluid conduit during installation is described above in the context of a ball valve, it will be appreciated that the same arrangement can be applied in other components. For example, protective features like the ridges 72 can be used with other types of valves (e.g., gate valves) or in any other components (e.g., flow meters) intended to be installed in, and facially seal against, a fluid conduit.

As pressure within the valve 10 increases, or as external forces act on the valve 10 or the fluid conduit in which it is installed, the conduit (e.g., flanges 40 of the connectors 14 and 16) can separate from the body 12 and the adjacent closure members 36. And such deflection of the flanges 40 from the seals on the outer surfaces of the closure members or facial sealing rings 36 could impair the ability of the seals to maintain sealing engagement with the flanges 40 and cause leaks from the fluid conduit. But in some embodiments, including the one depicted in FIGS. 13-17, the valve 10 improves facial sealing between the valve and the fluid conduit by providing the closure member 36 as an adaptive, floating closure member that is allowed to axially translate with respect to the body 12 along the fluid conduit axis to compensate for flange or conduit deflection. And pressure provided by fluid entering the valve 10 from the fluid conduit maintains positive pressure on the closure member 36 to maintain sealing engagement during such separation of the flange from the valve.

Figure 14:
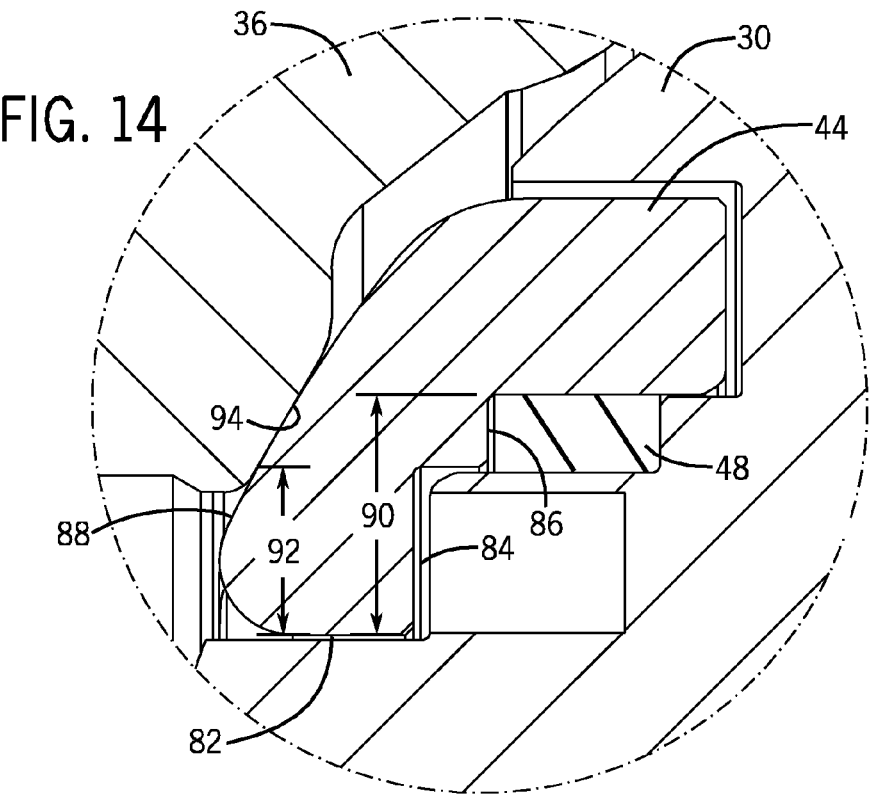

As discussed in greater detail below with respect to FIGS. 16 and 17, the shoulders 34 of the closure members 36 are received in oversized recesses in the body 12 that allow translation of the closure members 36 along a flow path of the valve. But first referring to FIGS. 13 and 14, when the valve 10 is closed the seats 44 seal against sealing surfaces 94 on the inner parts of the closure members 36. As shown in FIG. 14, a fluid path or passage 82 between the seat 44 and the ball 30 allows fluid to enter a region behind the seat 44 along rear surfaces 84 and 86 and the pressure of this fluid applies a force to the seat 44 toward the sealing surface 94 of the closure member 36. The pressure of fluid at the front surface 88 of the seat 44 similarly applies a contrary force away from the sealing surface 94.

But while the pressure of the fluid acting on the front and back of the seat 44 may be equal, the area over which this pressure acts is not. Particularly, in the present embodiment the projected area of the rear surfaces 84 and 86 on which the pressurized fluid acts (generally represented by arrow 90 and measured in a plane orthogonal to the axis of translation of the closure member 36) is greater than the projected area of the front surface 88 on which the pressurized fluid acts (generally represented by arrow 92 and again measured in a plane orthogonal to the axis of translation of the closure member 36). Consequently, the net force on the seat 44 from the pressurized fluid is directed toward the closure member 36—the pressure pushes the seat 44 into the closure member 36 and the closure member 36 into the fluid conduit (e.g., flange end 40 of connector 14). In those embodiments in which the closure member 36 is a floating closure member, the fluid pressure on the seat 44 drives axial translation of the closure member 36 toward the fluid conduit to maintain proper sealing engagement with the fluid conduit when it deflects away from the body 12.

Figure 15:
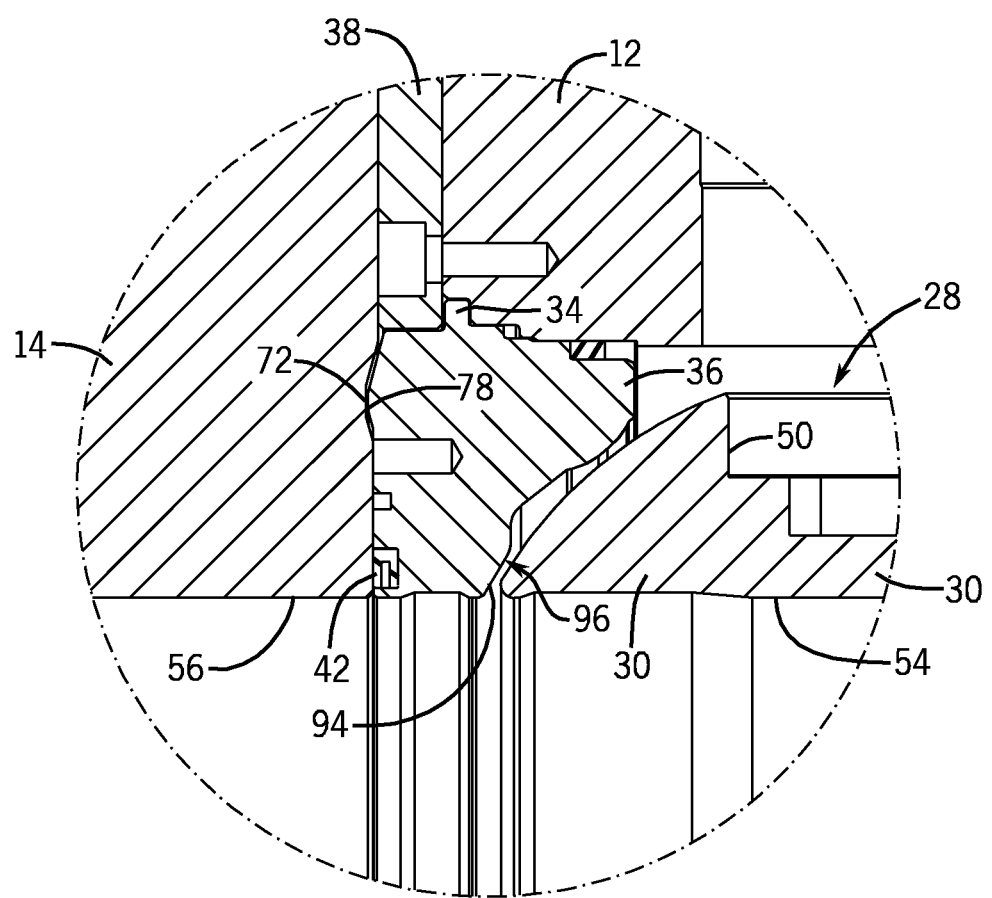
FIG. 15 is a cross-section generally depicting the valve of FIG. 2 in an open position in which the passage of fluid between the ball and the closure member pushes the closure member into the connector of the fluid conduit in accordance with one embodiment.

The valve 10 may also be configured to provide positive pressure on the closure member 36 when the valve is in an open position, as depicted in FIG. 15. Particularly, when the valve 10 is open, fluid is allowed to enter between the closure member 36 and the ball 30 through a fluid passage or interstice 96. The pressure of the fluid between the ball 30 and the closure member 36 applies a force on the closure member 36 toward the fluid conduit (connector 14 in FIG. 15). And with the ability of the closure member 36 to axially translate within the body 12, this force on the closure member 36 may maintain proper sealing engagement with the fluid conduit even when the end of the conduit deflects away from the body 12.

Figure 16:
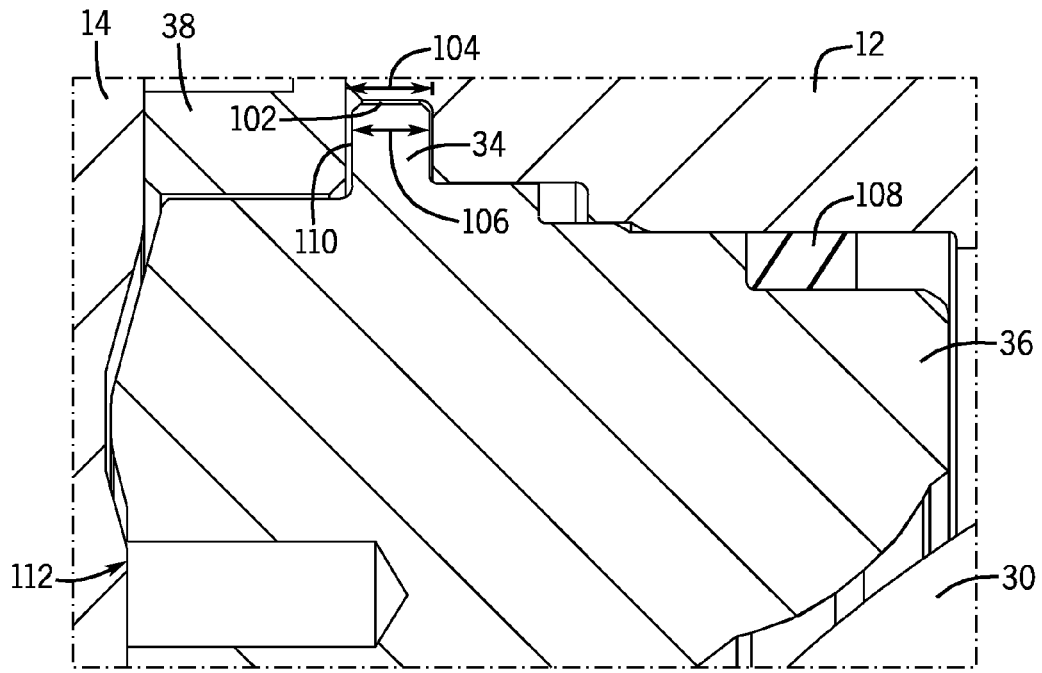
FIGS. 16 and 17 are cross-sections of a closure member and other components of FIG. 2, in which the closure member is depicted as a floating closure member, in accordance with one embodiment, having a shoulder retained in a recess that allows the floating closure member to axially translate with respect to the valve body to maintain sealing engagement between the floating closure member and an adjacent connector of a fluid conduit.
Figure 17:
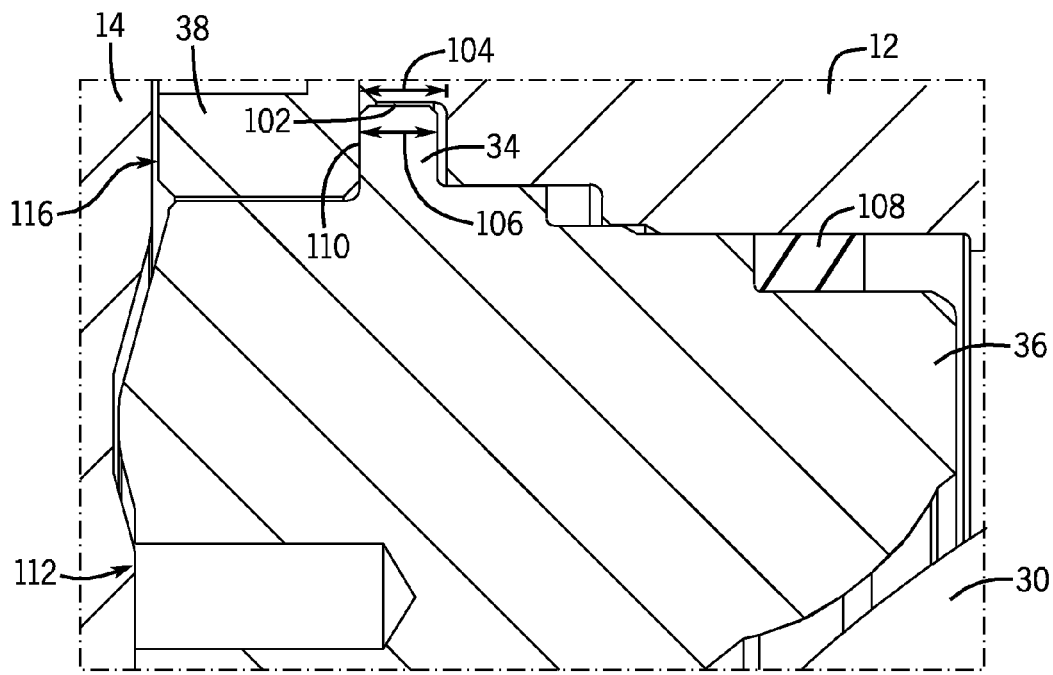

Additional details about the axial translation of the floating closure members 36 are depicted in FIGS. 16 and 17 in accordance with one embodiment. As shown in FIG. 16, the shoulder 34 of the closure member 36 is received in a recess 102 in the body 12. The recess 102 has an axial width 104 that is greater than the axial width 106 of the shoulder 34, thus allowing the shoulder 34 to translate within the recess 102. The amount by which the width 104 exceeds the width 106 may vary between different embodiments based on operating considerations (e.g., expected maximum deflections of flanges 40 from the valve 10). In one embodiment, the width 104 is 0.5 millimeters greater than the width 106 to allow a 0.5 millimeter range of axial motion of the closure member 36. But in other embodiments, the width 104 may exceed the width 106 by other amounts (e.g., 0.3 millimeters, 0.7 millimeters, 1.0 millimeters, 2.0 millimeters, or even greater amounts) to provide corresponding ranges of motion for the closure members. The closure member 36 may also include a radial seal 108 that seals against the body 12 while accommodating axial translation of the closure member 36.

In FIG. 16, the shoulder 34 is positioned at an intermediate location in the recess 102 and the closure member 36 is depicted as in tight contact with the fluid conduit (here represented as connector 14) at an interface 112. Upon deflection of the fluid conduit away from the valve body 12 to create a gap 116 (FIG. 17) between the conduit and the retaining ring 38 of the body 12, the closure member 36 can translate axially to the left (with surface 110 of the shoulder approaching the retaining ring 38) to maintain tight contact at the interface 112 of the closure member 36 and the fluid conduit. In some embodiments, both closure members 36 are adaptive, floating closure members.

While the presently disclosed use of a floating closure member 36 may be beneficial in other contexts, the use of a floating closure member 36 may be particularly beneficial in a compact, cartridge valve arrangement in which lighter structures are employed to reduce mass but result in larger deformations under load conditions. Thus, the inclusion of a floating closure member 36 in some embodiments allows the valve 10 to compensate for separation between the fluid conduit and the valve without increasing the thickness of the valve and conduit or incurring greater bolting requirements.

Additionally, it is noted that valves are often used to control the flow of fluids including particles (e.g., slurries or other abrasive fluids including particles of sand or of some other solid). These particles may negatively impact seals and sealing surfaces, causing deterioration in valve sealing performance over the life of a valve. Additionally, the design of some valves can trap such particles near sealing surfaces, further interfering with sustained operation of the valves. But in some embodiments, such as that depicted in FIGS. 18 and 19, the valve 10 includes features that deflect particles away from sealing surfaces. These features may also promote flushing of particles from the sealing surfaces.

Figure 18:
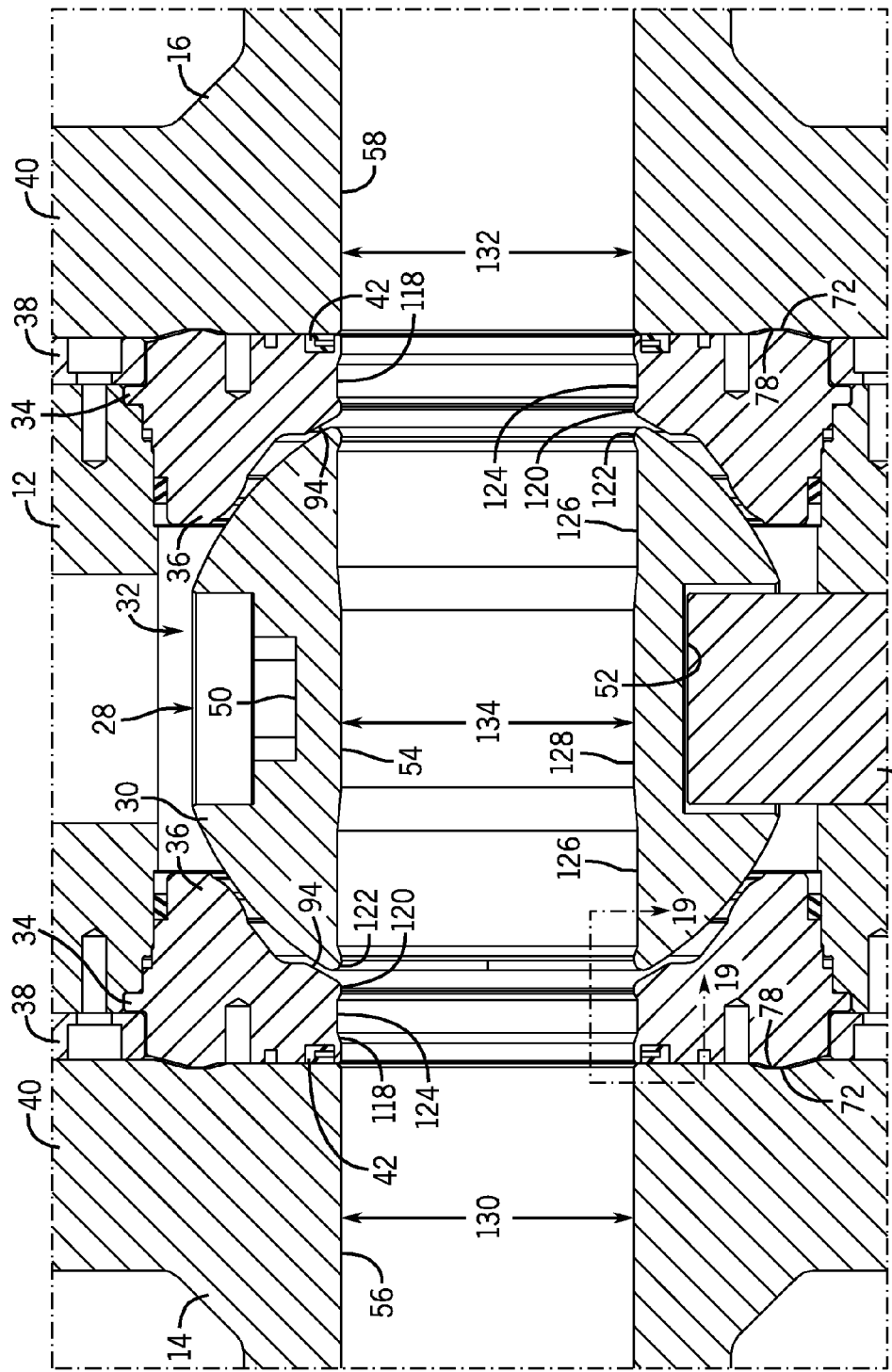
FIG. 18 is a cross-section that depicts a bore of the valve of FIG. 2 that has a shaped profile or contour that deflects particles away from sealing surfaces in accordance with one embodiment.

As depicted in FIG. 18, a bore of the valve 10, including bores 118 of the closure members 36 and the bore 54 of the ball 30, is a contoured bore shaped to deflect particles away from sealing surfaces. More specifically, the bores 54 and 118 include particle-deflection features 120 and 122. These features 120 and 122 are provided in the form of raised deflectors or lips 120 and 122 on the bores, though other embodiments could include different deflecting features. The bores 54 and 118 may also include recesses 124 and 126 adjacent to the lips 120 and 122. In the presently depicted embodiment, the bore 54 of the ball 30 is a symmetric, polycylindrical bore having a straight bore portion 128 in the middle of the ball 30 between other straight bore portions defined by the recesses 126. The straight portions may be connected to one another in any desired fashion, such as by conical tapers between the recesses 126 and the straight bore portion 128.

Moreover, by allowing the lips 120 and 122 to rise from the recesses 124 and 126, the recesses 124 and 126 of the present embodiment enable the flow bore of the valve to be maintained at a generally constant diameter. That is, although the lips 120 and 122 and the recesses 124 and 126 cause minor variation in the diameter of the bore through the valve 10, the diameters of the bore at the crests of the lips 120 and 122 are the same as the diameters 130 and 132 of the bores 56 and 58, as well as the diameter 134 of the bore portion 128 of the ball 30.

Figure 19:
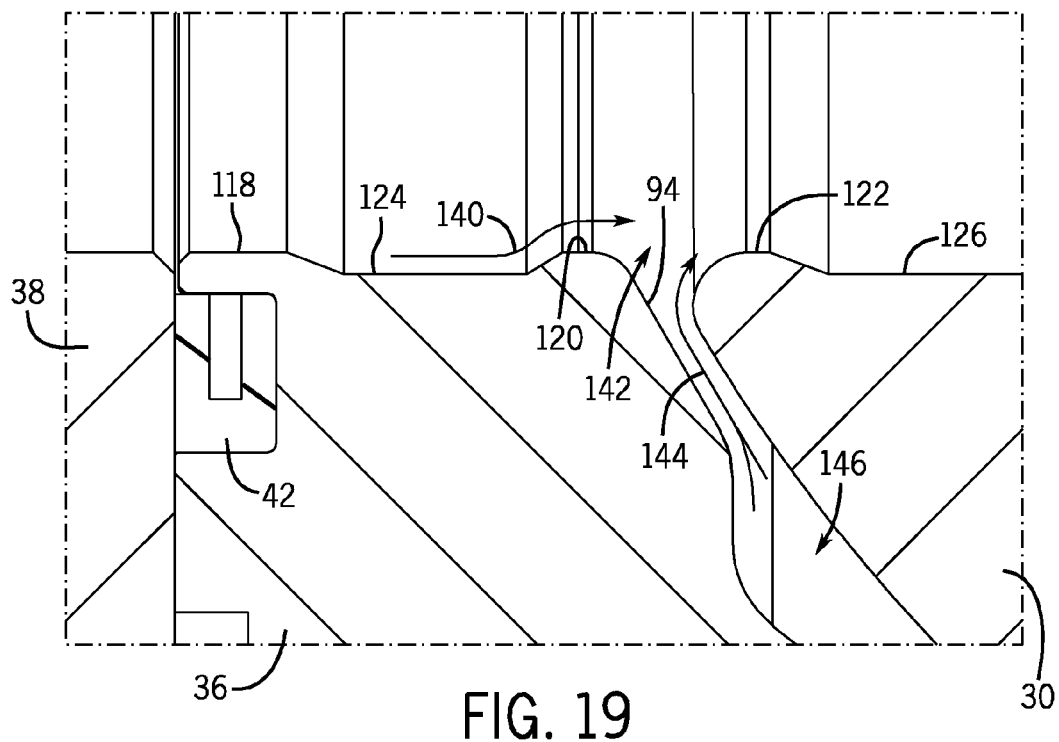
FIG. 19 is a cross-section of the region bound by line 19-19 in FIG. 18 and depicts the creation of a low-pressure region by the shaped bore that draws particles out of an interstice between the closure member and the ball of the flow control assembly in accordance with one embodiment.

The lips 120 and 122 function to deflect particles of a particle-laden fluid away from sealing surfaces of valve 10. As depicted in FIG. 19, as fluid flows from left to right the lip 120 deflects particles, as generally represented by arrow 140, toward the center of the fluid stream and away from the sealing surface 94 of the closure member 36. This deflection itself reduces the ingress of particles from the fluid stream into the space between the closure member 36 and the ball 30 and creates a protective fluid envelope along the bore near sealing surface 94.

Figure 20:
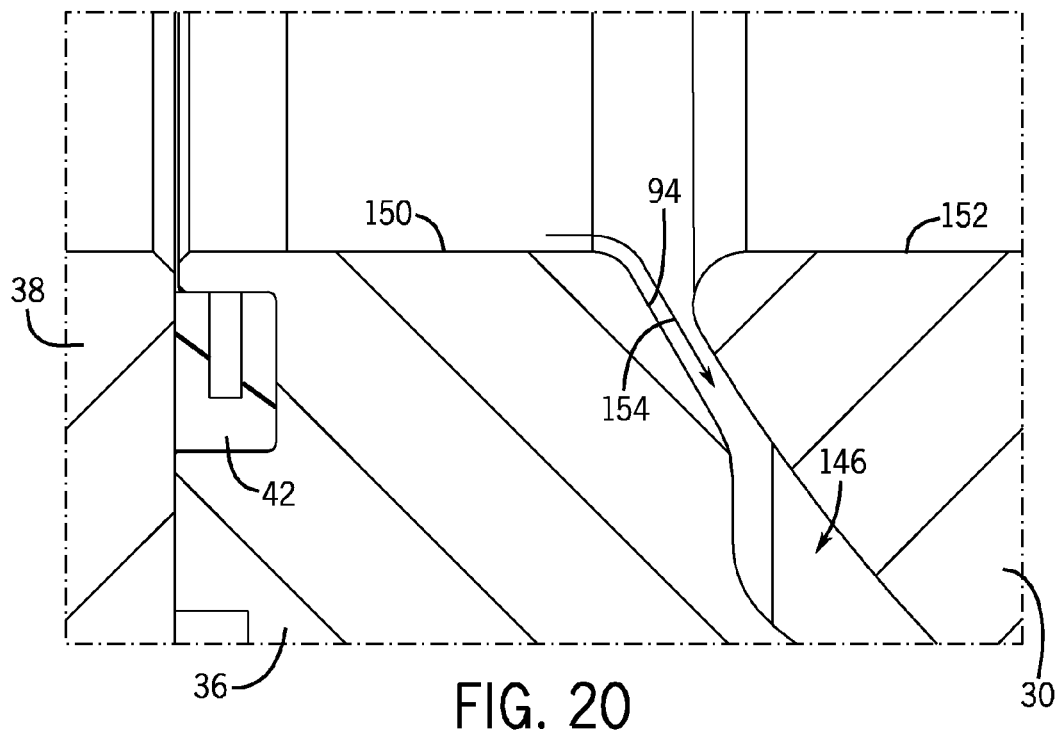
FIG. 20 is a cross-section similar to that of FIG. 19 but with a straight bore that does not create the low-pressure region of FIG. 19 and does not inhibit particle flow toward sealing surfaces.

Additionally, in the presently depicted embodiment the deflection of particles away from the sealing surface 94 by the lip 120 creates a Venturi effect (or a depressurization of fluid) in the bore in a low-pressure region 142 (compared to other regions in fluid stream in the valve) beyond the lip 120 and radially inward from an interstice or space 146 between the closure member 36 and the ball 30. The lower pressure in the region 142 draws fluid and particles out of the space 146 (as generally represented by arrow 144), in essence gently flushing particles from this space and cleaning the sealing surfaces (e.g., surface 94). This is in contrast to a valve depicted in FIG. 20 as having straight bores 150 and 152 without fluid deflection features, which instead do not inhibit the entry of particles from the fluid stream into the space 146 (as generally represented by arrow 154). The other lips 120 and 122 of FIGS. 18 and 19 may operate similarly to the lip described above, depending of course on the direction of flow through the valve 10.

Figure 21:
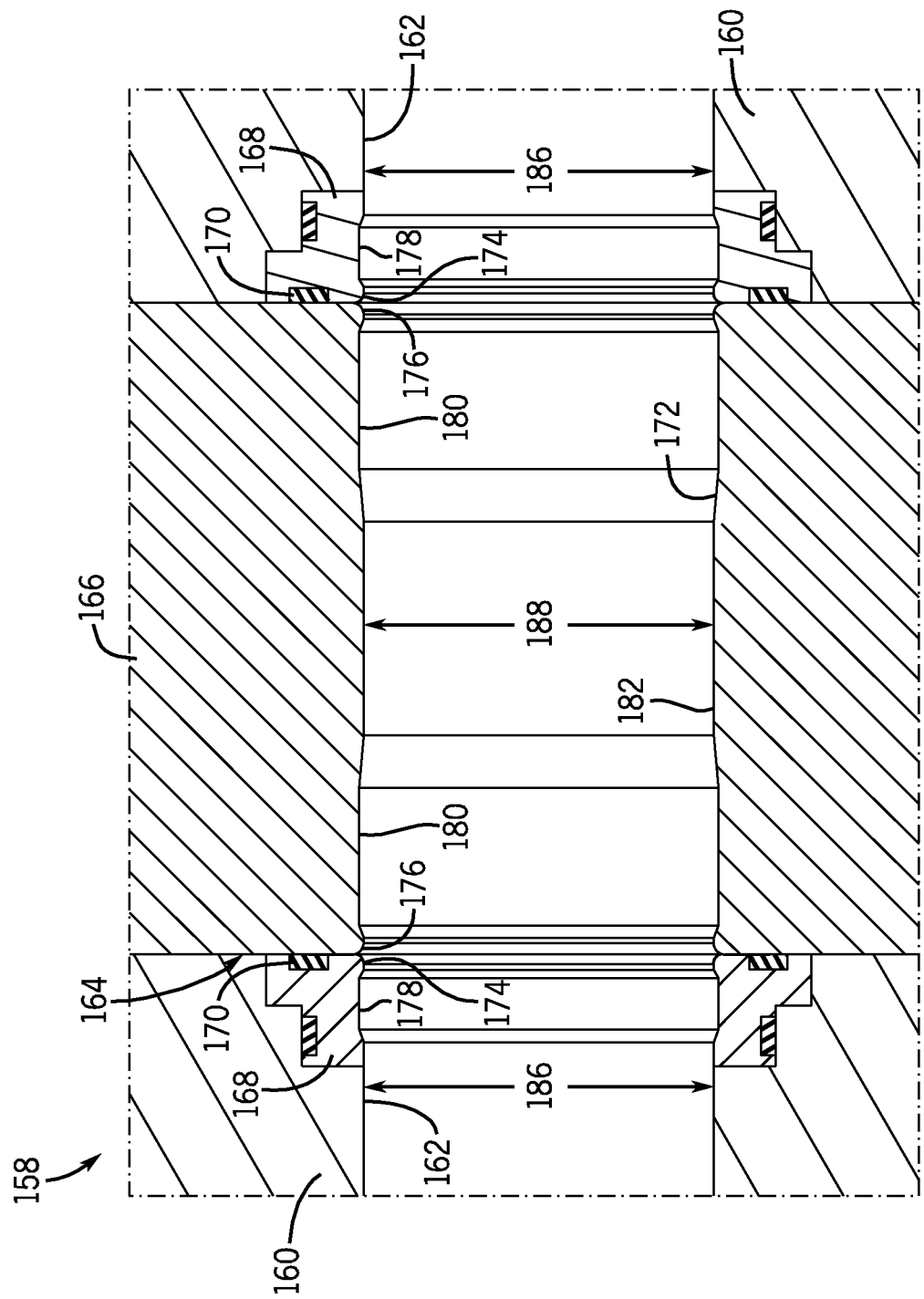
FIG. 21 is a cross-section of a gate valve in accordance with one embodiment having a bore shaped to deflect particles away from a sealing surface.

While the fluid-deflecting and cleaning features disclosed above are described in the context of a ball valve 10, these features may be used in other types of valves as well (e.g., gate valves or check valves). Indeed, any valve with sealing surfaces close to a bore of the valve to be used to control the flow of particle-laden fluids may benefit from the present techniques. For instance, FIG. 21 depicts one embodiment of a gate valve 158 including such features.

The gate valve 158 includes a body 160 having a bore 162. A flow control assembly 164 is provided to selectively interrupt flow through the valve 158 by moving a gate 166 transverse to the bore 162 to open and close the valve. Seats 168 of the flow control assembly 164 include seals 170 near the valve bore to seal against the gate 166. Bores of the seats 168 include lips 174 and recesses 178, while a bore 172 of the gate 166 includes lips 176 and recesses 180. These lips and recesses may operate similarly to those described above with respect to ball valve 10. More specifically, these features may deflect particles in a fluid stream toward the center of the fluid stream and away from sealing surfaces (e.g., away from the seals 170), and may create Venturi effects near the lips that draw particles out of interstices between the seats 168 and the gate 166. Also, the recesses 178 and 180 facilitate maintenance of a generally constant-diameter flow bore in which the diameters of the bores at the crests of the lips 174 and 176 are equal to the diameter 186 of the bore 162 and the diameter 188 of a straight portion 182 in the middle of the gate 166.

Technical effects of some of the presently disclosed embodiments include improved longevity, increased pressure tolerances, and reduced leaking in valves. As described above, in some embodiments the inclusion of protective ridges on closure members of a valve reduces wear and damage to certain seals and sealing surfaces. Further, the inclusion of a floating closure member in some embodiments allows a valve to compensate for flange or conduit deflection away from the valve and maintain sealing. And in some embodiments fluid deflection features in valve bores route damaging particles away from sealing surfaces. Various embodiments of the present technique may include one or more of these features, or of other features described above.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve comprising:
a body;
a flow control assembly inside the body, the flow control assembly including a ball and a closure member having a shoulder enclosed within a recess of the body, wherein the closure member is a floating closure member in that the recess in the body is larger than the shoulder of the closure member to allow movement of the closure member with respect to the body and along a flow path through the valve;
the flow control assembly includes a seat coupled to the ball and a fluid path between the seat and the ball that allows fluid to enter a region between the seat and the ball; and the seat, the ball, and the closure member are configured such that, in operation when the valve is closed, pressure of the fluid between the seat and the ball generates force that overcomes force generated by fluid on the opposite side of the seat to push the seat into the closure member.

2. The valve of claim 1, wherein the valve is configured to be coupled to a connector of a fluid conduit, the connector including a bore that enables fluid communication between the fluid conduit and the body of the valve.

3. The valve of claim 2, wherein the recess of the body and the shoulder of the closure member are sized to enable at least a 0.5 millimeter range of movement of the closure member during operation of the valve to facilitate sealing of the closure member against the connector.

4. The valve of claim 2, wherein the valve is configured to maintain engagement of a seal of the closure member against the connector when forces on the valve or the fluid conduit during operation cause the connector to separate from the body of the valve.

5. The valve of claim 2, wherein the body of the valve includes a retaining ring that retains the shoulder of the closure member in the recess in the body.

6. The valve of claim 1, wherein the seat is positioned in the body to be disposed between the ball and the closure member when the valve is closed.

7. The valve of claim 1, wherein the seat, the ball, and the closure member are configured such that, in operation when the valve is closed, the pushing of the seat into the closure member causes the closure member to push into a connector of a fluid conduit.

8. The valve of claim 1, wherein the flow control assembly includes an additional floating closure member having a shoulder enclosed in a second recess in the body.

9. The valve of claim 1, wherein the valve is a cartridge valve in which the body and the flow control assembly are configured to be installed in a fluid conduit by moving the body with the flow control assembly transverse to the axis of the fluid conduit between a pair of connectors of the fluid conduit.

10. A method comprising:
receiving fluid in a ball valve disposed between first and second sections of a fluid conduit, the ball valve including a closure member disposed in a valve body and configured to seal against the first section of the fluid conduit; and
maintaining sealing of the closure member with the first section of the fluid conduit by enabling the closure member to move with respect to the valve body in response to movement of the first section of the fluid conduit with respect to the valve body, wherein maintaining sealing of the closure member includes allowing some of the fluid into a region between a ball of the ball valve and a seat of the ball valve when the ball valve is closed such that the pressure of the fluid in the region causes a net force on the seat that pushes the seat into the closure member to maintain sealing of the closure member with the first section.

11. The method of claim 10, wherein maintaining sealing of the closure member includes allowing some of the fluid to pass through a fluid path between the ball and the closure member when the ball valve is open such that the pressure of the fluid passing through the fluid path maintains sealing of the closure member with the first section.

* * * * *